United States Patent [19]

Adams, Jr. et al.

[11] E Patent Number: Re. 33,690

[45] Reissued Date of Patent: Sep. 17, 1991

[54] LEVEL SENSOR

[75] Inventors: Harold P. Adams, Jr., Oil City; Andrew B. Maitland, Cranberry; David R. Hill, Oil City, all of Pa.; William E. Banton, Derry, N.H.; Lee M. Richey, Franklin; David C. Taylor, Slippery Rock, both of Pa.

[73] Assignee: Oil Well Automation, Inc., Seneca, Pa.

[21] Appl. No.: 505,346

[22] Filed: Apr. 5, 1990

Related U.S. Patent Documents

Reissue of:

[64] Patent No.: 4,747,451
Issued: May 31, 1988
Appl. No.: 82,840
Filed: Aug. 6, 1987

[51] Int. Cl.[5] ..... E21B 43/00; E21B 47/06; F04B 49/06

[52] U.S. Cl. ..... 166/53; 73/155; 166/65.1; 166/105; 166/369; 340/856; 417/36

[58] Field of Search ..... 166/369, 53, 65.1, 105, 166/66.4; 340/856, 853, 618; 73/155; 417/36, 63

[56] References Cited

U.S. PATENT DOCUMENTS

| | | | |
|---|---|---|---|
| 3,437,992 | 4/1969 | Johnston | 340/856 |
| 3,915,225 | 10/1975 | Swink | 166/65.1 X |
| 3,965,983 | 6/1976 | Watson | 166/369 X |
| 4,181,468 | 1/1980 | Kent et al. | 417/63 |
| 4,318,298 | 3/1982 | Godbey et al. | 73/155 |
| 4,391,135 | 7/1983 | Godbey et al. | 73/155 |
| 4,392,782 | 7/1983 | Kuehn, III et al. | 417/36 |
| 4,413,676 | 11/1983 | Kervin | 166/53 |
| 4,570,718 | 2/1986 | Adams, Jr. | 166/369 |
| 4,875,497 | 10/1989 | Worthington | 417/36 X |

*Primary Examiner*—Stephen J. Novosad
*Attorney, Agent, or Firm*—Webb, Burden, Ziesenheim & Webb

[57] ABSTRACT

A system for controlling production in an oil well comprises a first level sensor mounted upon the outer surface of the tubing near the lower end of the tubing and a second level sensor mounted upon the outer surface of the tubing above the first level sensor. The first level sensor is tuned to a first electrical signal frequency. The second level sensor is tuned to a second electrical signal frequency. A control device at spaced intervals transmits electrical signals of the first and second frequencies down the oil well and senses the liquid level by detecting impedance.

19 Claims, 6 Drawing Sheets

LEVEL SENSOR

Matter enclosed in heavy brackets [ ] appears in the original patent but forms no part of this reissue specification; matter printed in italics indicates the additions made by reissue.

BACKGROUND

The invention disclosed herein relates to an improved apparatus for automatically regulating the pumping of an oil well based upon the detected liquid level in the well.

Unfortunately, few oil wells in the United States are self flowing and therefore most wells must be pumped. Usually, wells have a pump near the bottom of the borehole that is activated by a string of sucker-rods extending down through the borehole to the pump. The sucker-rods are attached to a polish-rod at the surface. The polish-rod extends through a stuffing box and is attached to the mechanical unit that produces the necessary reciprocating motion to actuate the sucker-rods and the pump. Typically, the polish-rod is attached to a walking beam pivotally mounted to a post. A counter balancing weight may be directly or indirectly attached to the opposite end of the beam. As the beam is rocked by the action of a motor, the sucker-rods are raised and lowered.

In typical operation, the oil in the borehole is pumped out. Then pumping is discontinued and oil and sometimes salt water is allowed to seep into the borehole from the surrounding oil-bearing formation. Build up of liquids in the borehole produces a back pressure which impedes the inflow from the formation. Thus, productivity is reduced if the oil in the borehole is not timely removed after accumulating. On the other hand, it is not desirable to operate the pump after the oil level has fallen below the pump inlet. To do so causes physical damage and wearing of the pump and unnecessary wear on the entire system.

Past and present practice in oil well pumping involves manually setting electric timers to control the pumping based upon an operator's estimation of the time required to extract the down-hole fluid to a point where no more fluid can be removed. This is known as "pumping off" the well. The disadvantages of this method are excessive wear to down-hole components due to excessive pumping, unnecessary man-hours needed to operate the wells and lower fluid production reducing income due to under pumping.

Automatic liquid level monitoring has long been proposed and the literature includes teachings of proposed schemes for automatic control. See, for example, U.S. Pat. No. 4,392,782. As emphasized in the prior art, there are two basic problems to overcome: transferring or generating electrical power down-hole for the level sensor and transferring the liquid level information back up the hole. U.S. Pat. No. 4,318,298 discloses an apparatus that is entirely at the wellhead to avoid both of these problems by using an acoustical device to sense the depth of the liquid within the well. A drawback of the system is that it is affected by foam within the well. Also the mechanical apparatus at the wellhead is complicated. U.S. Pat. Nos. 3,437,992 and 4,570,718 disclose approaches to solving the problem of supplying power to a down-hole sensor by using the mechanical motion of the casing or the changes in pressure during pumping to drive a down-hole generator. The '992 patent teaches transferring the information up hole by direct current pulses applied across the casing and tubing. The '718 patent teaches transferring the information up hole acoustically.

The preferred liquid level detectors used in the apparatus according to the applicants' invention sense change in capacitance between two plates. It is a characteristic of many oil wells that the borehole not only fills with oil but also with salt water. The oil having the lower density floats on the top of the salt water. The presence of salt water creates a number of problems. Salt water will short out the plates of the capacitive detector unless they are electrically insulated. Salt water will short the tubing to the casing making them useless for transferring power down-hole or information up hole. Finally, salt water between the plates of the capacitive detector will change the reading by the capacitive detector much more dramatically than will oil. The relative capacitance readings of air, oil and salt water are 1, 2–6, and 70 respectively.

SUMMARY OF THE INVENTION

It is an object according to this invention to provide a system for automatic well pumping resulting in better recovery of oil, increased production, reduced man-hours and down-hole component wear.

It is a further object of this invention to minimize the amount of electrical circuitry down-hole and to supply power to the circuitry in a unique manner.

It is yet a further object of this invention to sense the condition of the down-hole level entirely from the wellhead.

Briefly, according to this invention, there is provided a system for controlling production in an oil well. The well has a casing naturally at electrical ground potential. The well has tubing within the casing. Typically, sucker-rods extend down through the tubing and there is apparatus at the wellhead for causing reciprocation of the sucker-rods to activate a pump at the lower end of the tubing. Other types of pumps and other means for alternating the pumps are contemplated according to this invention. All of the aforesaid are typical.

Essential to the specific purposes of this invention, electrical insulating centralizers isolate the tubing from ground potential so that the casing and tubing form a coaxial electrical conduit. A first liquid level sensor is mounted upon the outer surface of the tubing near the lower end of the tubing. Preferably, the level sensor has insulated electrodes between which liquid can flow thus changing the capacitance therebetween. The sensor has an electrical circuit for sensing a condition associated with liquid at the level, for example, the capacitance between electrodes. The sensor is provided with an arm pressing against the adjacent casing to establish an electrical ground. The sensor is provided with a circuit for tuning it to a first electrical signal frequency such that when an electrical signal of the first frequency is transmitted down the oil well it will power and activate the sensor to throw an electronic switch to establish a high or low impedance between the casing and tubing according to whether liquid is detected at the lower level.

A second capacitive level sensor is mounted upon the outer surface of the tubing above the first sensor, for example, near the top of the oil bearing formation. It may be identical to the first sensor except that it is tuned to a second electrical signal frequency such that when the second frequency is transmitted down the oil well the second sensor will be powered and activated to throw an electronic switch to establish a characteristic impedance between the casing and the tubing according to whether liquid is detected at the upper level.

An electrical controller at the wellhead, at spaced time intervals, transmits electrical signals of the first and second frequencies down the oil well and detects the impedance of the conduit comprising the casing and tubing to the electrical signals. When the first sensor indicates no liquid at the lower end of the tubing by presenting a preestablished impedance to the signal of the first frequency, the controller turns off the apparatus for activating the pump. When the second sensor indicates liquid present at the upper sensor by presenting a preestablished impedance to the signal of second frequency the controller turns on the apparatus for activating the pump.

Preferredly, in the system according to this invention each of the first and second level sensors comprises an electronic circuit that closes an electronic switch that connects a resistance between the tubing and the arm for establishing an electrical ground with the adjacent casing depending upon the level of the liquid at the sensor to thereby change the impedance detectable by the electronic controller.

In one embodiment of the system according to this invention, the electronic circuits of the sensors each comprise rectifier circuits to establish a DC power source when an electrical signal at the frequency to which it is tuned is applied, an oscillator powered by said DC power source, a capacitance bridge to which the oscillator output is applied, and a threshold circuit for detecting when the output of the capacitance bridge is above (or below) a selected threshold. The output of the threshold circuit is applied to the gate of said electronic switch.

To overcome some of the problems resulting from a conductive fluid in the borehole, electrically insulating sections of tubing are placed just below each sensor. An insulated bandpass filter tuned to the signal frequency that activates the lower sensor must bridge the insulating section below the upper sensor. An electrically conductive fluid below the lower sensor will have no effect on the impedances detected by the controller. A conductive fluid below the upper sensor will have no effect on the impedances determined when the electrical signal of frequency to which the upper sensing means is tuned is applied.

In the most preferred embodiment of the system according to this invention, the electronic controller includes a programmed computer having a stored program for, at spaced intervals, commanding the output of signals of the first and second frequencies and for commanding the input of a numerical representation of the impedance of the coaxial electrical conduit comprising the casing and tubing and for turning pump motor on/-off. During the pump down from the upper to lower sensors, the controller tests for a high impedance condition before accepting a low impedance condition as indicative of liquid dropping below the lower sensor to thereby avoid false readings due to shorting of the casing and tubing by conductive liquids between them and above the lower sensor and below the upper sensor.

DESCRIPTION OF THE DRAWINGS

Further features and other objects and advantages will become clear from the following description made with reference to the drawings in which.

DESCRIPTION OF THE PREFERRED EMBODIMENT

Figure 1:
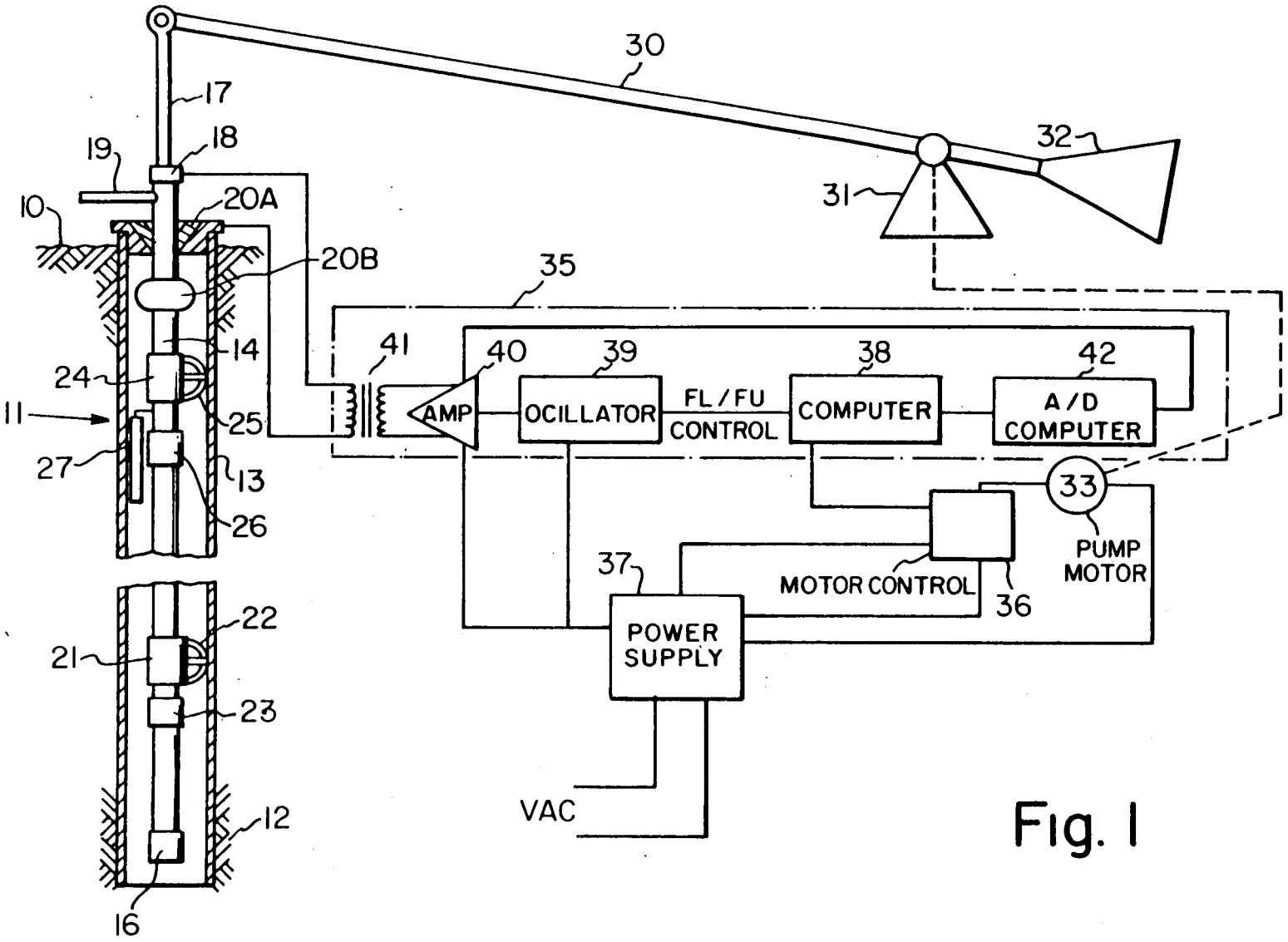
FIG. 1 is a schematic diagram illustrating the positioning of sensors in the well borehole and the apparatus at the wellhead including the controller.

Referring to FIG. 1, there is shown a schematic view of an oil well. The ground level 10 is indicated with the bore 11 extending down into the producing formation 12. As is typical, the bore is cased with steel casing 13 for maintaining the integrity of the bore. Hung from the surface within the casing is steel tubing 14. At the base of the steel tubing is the pump barrel 16 in which the pump is located. Extending upward from the pump is the sucker-rod string 17. The topmost sucker-rod is polished and reciprocates within a stuffing box 18. A flow-tee 19 is provided for directing the oil pumped up through the interior of the tubing to change directions and exit through a flow line. The tubing is hung at the wellhead in a manner to electrically insulate the tubing from the casing, for example, as by providing an insulating material 20A therebetween. Insulating spacers 20B are positioned at spaced intervals along the length of the tubing to space the tubing from the casing at all points. Above the pump and near the lower end of the tubing is a lower level sensor 21 mounted on the tubing. A grounding strap 22 extends from the sensor housing and engages the casing. The grounding strap grounds the electrical circuitry of the sensor but does not otherwise ground the tubing to the casing. Just below the lower sensor 21 is an insulating section of tubing 23. This may comprise a glass fiber reinforced plastic composition, for example. Near the top of the oil bearing formation and mounted to the tubing is an upper level sensor 24 having a grounding strap 25. Just below the upper sensor is an insulated section of tubing 26. Bypassing the insulated section 26 is a bandpass filter 27 which will be explained in more detail hereafter.

The sucker-rod string is caused to reciprocate by a walking beam 30 pivoted upon a post 31 having a counter weight 32. The waling beam is caused to rock by a motor 33 that is connected to the beam by an arm (not shown).

At the wellhead is a controller 35 which has an output for turning the pump motor on and off by activating an electrical switch or the like 36. The controller 35 receives power from an electrical power supply 37, say, 110, 230 or 440 VAC, which also supplies power to the motor.

The controller is comprised of a programmed digital computer 38 and an oscillator 39 controlled by the computer to output an alternating current electrical signal at one of two frequencies, say, $F_L$ and $F_U$, where $F_U$ and $F_L$ are chosen so that $mF_U \pm nF_U \neq F_L$ or $F_U$ where m and n are integers. The controller has an output amplifier 40 and isolation transformer 41 such that the output signal is, for example, 24 volts alternating current. The output signal is applied across the casing and the tubing. A current feedback signal from the amplifiers is applied to an analog-to-digital converter 42 which can be read by the computer.

The upper sensor 24 is provided with a circuit tuned to the frequency $F_U$ electrical signal which will throw an electronic switch to establish a low impedance between the casing and the tubing when liquid is detected at the upper level. The lower sensor 21 is provided with an almost identical circuit which is tuned to the frequency $F_L$ electrical signal and which will throw an electronic switch to establish a low impedance between the casing and the tubing when liquid is detected at the lower sensor. The circuit for tuning the lower sensor may simply be the bandpass filter 27 that bridges the insulating section below the upper sensor. The details of the sensor circuit are described hereafter.

The controller at spaced time intervals transmits electrical signals at either frequency $F_L$ or $F_U$ down the oil well and detects the impedance of the conduit to the electrical signals by measuring the current draw via the feedback signal from the amplifier and analog-to-digital converter 42. When the lower sensor indicates no liquid at the lower end of the tubing by presenting a high impedance to the frequency $F_U$ signal the controller turns off the motor 33. When the upper sensor indicates liquid at the upper end of the tubing by presenting a low impedance to the frequency $F_L$ signal the controller turns on the motor. Whether liquid within the sensor capacitors is indicated to the controller by a high or low impedance in the conduit is somewhat of a matter of choice. It is not necessary that both upper and lower sensors use, say high impedance, to indicate liquid is present at the sensor.

For the system according to this invention to work the following points of electrical insulation must be maintained. The casing must be insulated from the tubing. The sucker-rods must be insulated from the pump jack. Just below both sensors must be an insulating section of tubing. The portion of the sucker-rods adjacent the insulating section of tubing below the upper sensor must be insulating material. If a water leak above the upper sensor causes a short by bridging the annulus between casing 13 and the tubing 14, insulated tubing must be used at and below this point.

Referring now to FIG. 2, there is shown in some detail the construction of the housing for the upper and lower level sensors attached to a section of tubing 50 having threads 51 and 52 at each end. A retaining ring 53 comprising a tapered radial flange, extends from the exterior surface of tubing 50 and serves to determine the axial position of the housing upon the tubing.

A lower insulator end cap 54 comprises an annular shape arranged to telescope over the tubing and to abut against the retaining ring 53. The end cap 54 has external threads 55 near the end that abuts the retaining ring and an annular recess 56 on the outer cylindrical surface thereof. An upper insulator end cap 57 comprises an annular shape arranged to telescope over the tube. It has a tapered annular recess 58 on the outer cylindrical surfaces thereof.

A tubular housing 59 is sized to telescope over the tubing 50 and to seat at each axial end in the tapered annular recesses of the upper and lower insulator end caps 54, 57, respectively. A retaining ring 60 turns on threads 51 at one end of the tubing to tighten against the retaining washer 67, tapered retaining ring 68 and the upper insulator end cap to capture the tubular housing between the upper and lower insulator end caps. The annular space between the tubular housing and the tubing encloses the electronics package 61, and is sealed from liquids in the borehole.

Figure 2A:
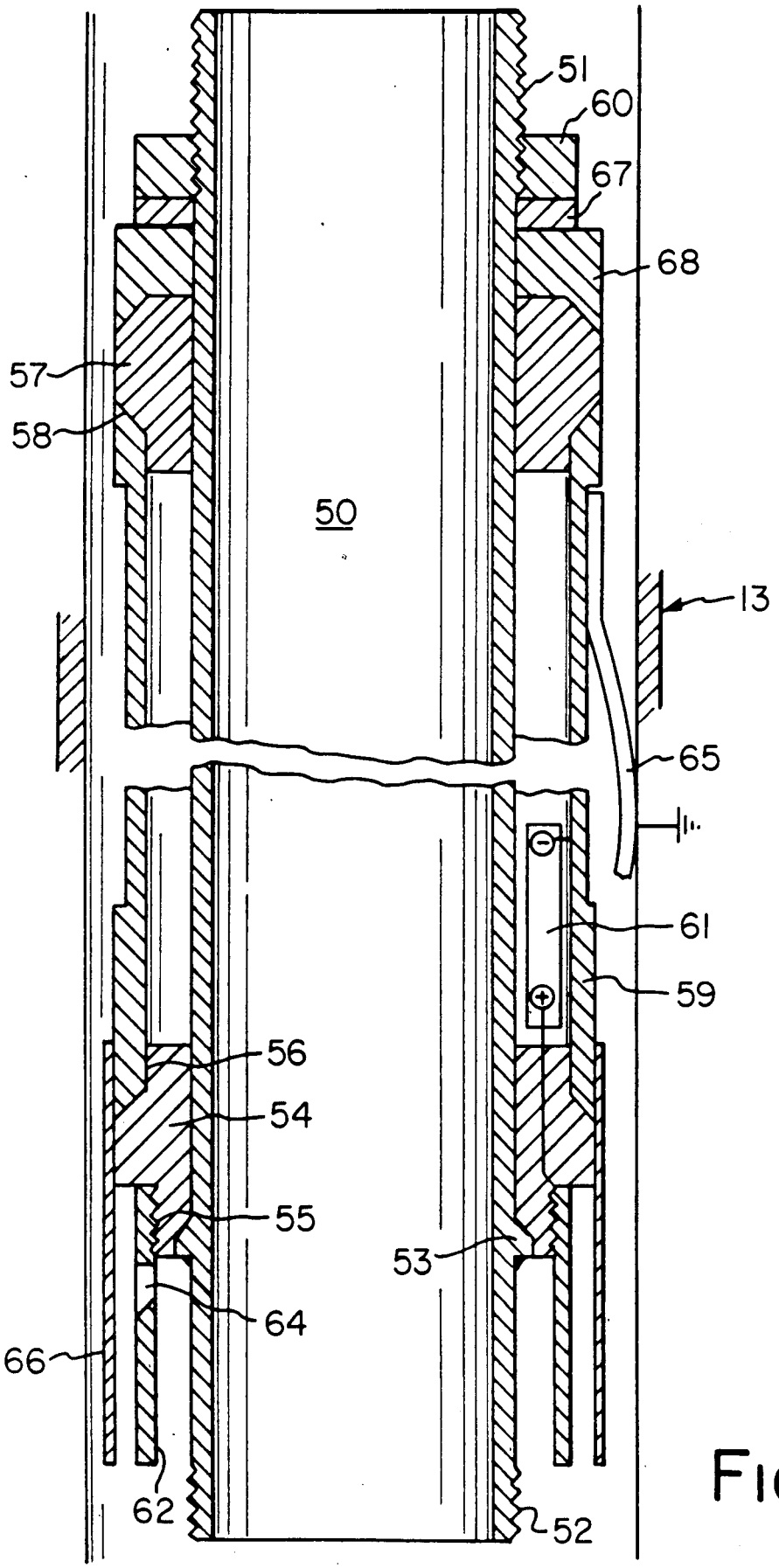
FIG. 2A is a section though the casing and tubing at the location of a sensor showing the sensor housing.

Two electrode configurations have been developed for use in capactive sensors according to this invention. In the configuration as shown in FIG. 2A, the electrode 62 is annular and has internal threads that engage external threads 55 on the lower insulator cap. The annular electrode is provided with openings 64 so that air or gas will not be trapped in the space between the tubing and the annular electrode. The tubing itself comprises the second electrode forming the sensor capacitor (the capacitance of which is measured to detect fluid at the level of the sensor). A conductor (not shown) is buried in the lower end cap for connecting the annular electrode to the electronics package. A shield 66 is incorporated on each sensor in order to eliminate capacitance interference caused by foreign matter between casing 13 and tubing 14.

Figure 2B:
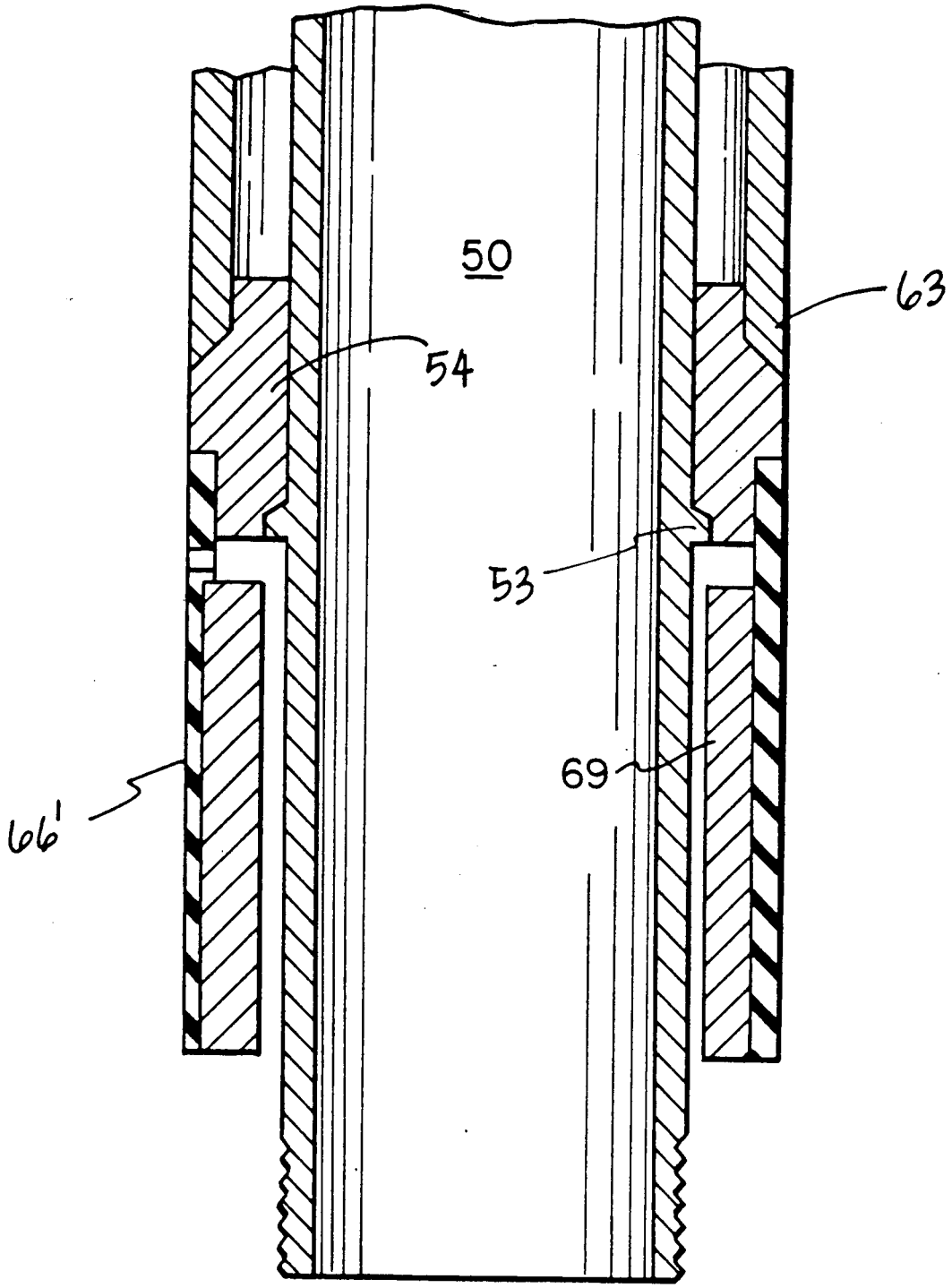
FIG. 2B is a broken out section through the casing showing the sensor housing and further showing a preferred electrode configuration.

A second electrode configuration is shown in FIG. 2B. In this embodiment, the tubing 50 is not used as one of the electrodes. A non-conductive cylinder 66' is radially spaced outwardly of the tubing and pendant from the lower end cap 54. An even number, say 14 to 30, electrode plates 69 are equally spaced from each other and are aligned on planes generally passing through the axis of the tubing. The plates make no contact with each other or with the non-conductive cylinder. There are two sets of plates, one set comprises every other plate connected to a lead wire of one polarity and the other set of plates comprises the remaining plates connected to a lead wire of opposite polarity. The two lead wires are buried in the end cap for connection to the electronics package.

At least one spring shoe or grounding strap 63 is welded at one end to the housing 59 and is arranged to press outwardly against the casing of the well borehole to establish the housing at ground potential.

Figure 3:
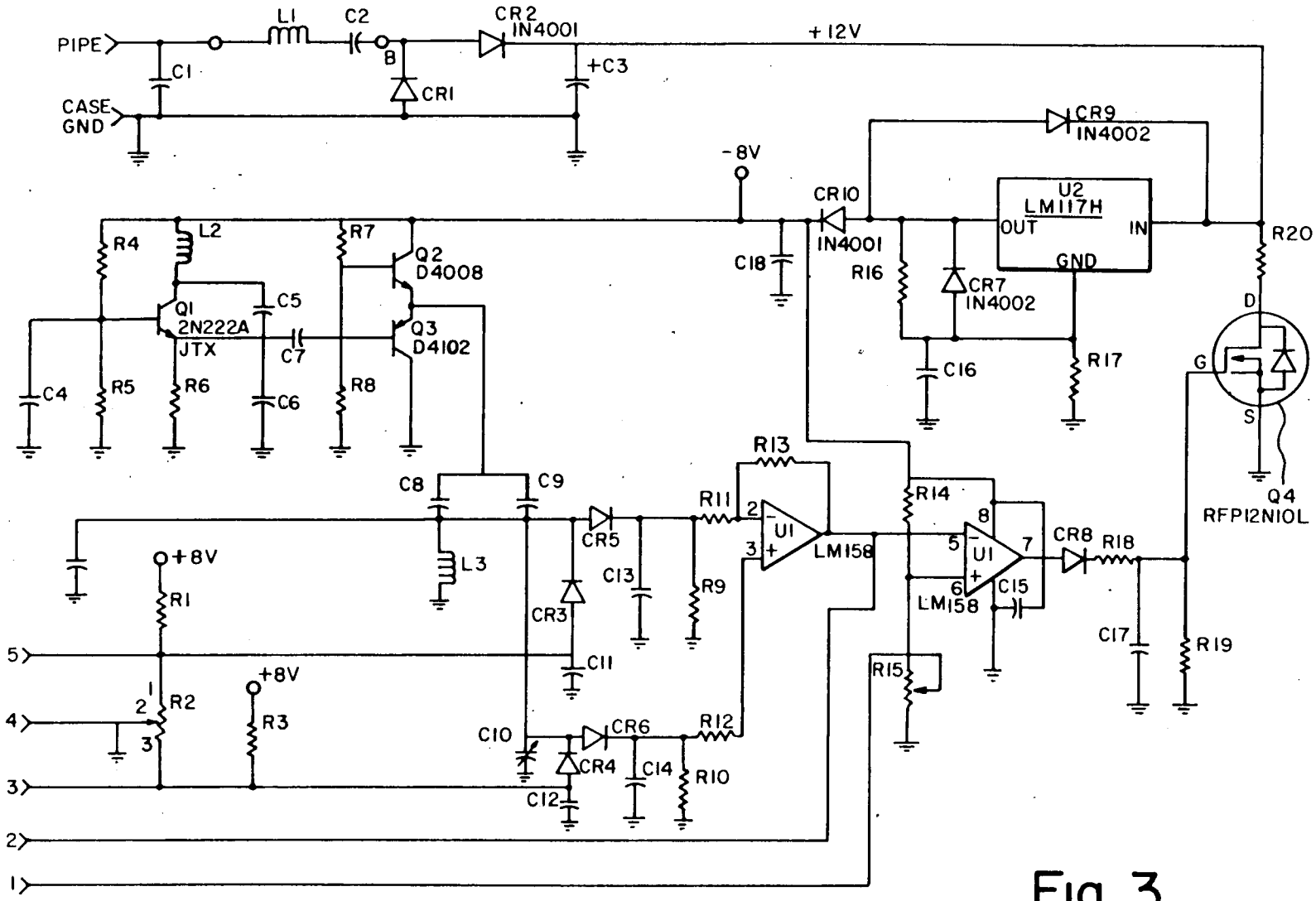
FIG. 3 is a circuit diagram for the sensor circuits down-hole.

Referring now to FIG. 3, the circuit of the upper sensor is set forth. The circuit of the lower sensor is substantially identical. The lower sensor circuit may not have the input filter section since a bandpass filter bridges the insulated section of tubing just beneath the upper sensor. Capacitors C1 and C2 and inductor L1 and diode CR1 comprise the filter section of the level sensor. The input to the filter is connected across the casing (at ground potential) and the tubing. Only signals of the frequencies to which the filter is tuned pass to the rectifier comprising diode CR2 and capacitor C3. The signal applied across the tube and casing is 24 volts VAC. The rectified signal provides a 12 volt unregulated DC power source. A regulator comprising integrated circuit chip U2 (LM117H) and associated passive components (diodes CR7, CR9, and CR10, resistors R16 and R17 and capacitor C16) provide a regulated 8 volts DC at capacitor C18.

A local oscillator comprising transistor Q1, Q2, and Q3 and the associated capacitors, resistors and inductor L2 provide an alternating current signal of uniform frequency and voltage. The output of the oscillator is applied to the detector bridge circuit. One side of the detector bridge comprises the capacitor C8 and the sensing capacitor and inductor L3 in parallel with the sensing capacitor. The other side of the detector bridge comprises the capacitor C9 and adjustable capacitor C10. The output of the detector bridge circuit is the output of a first operational amplifier on integrated circuit U1. The first operational amplifier compares the rectified outputs of opposite sides of the detector bridge. As the capacitance of the sensor capacitor changes, the voltage divided across that side of the bridge comprising L3 and the sensor capacitor changes thus changing the input to the first operational amplifier.

The output of the first operational amplifier is applied to a second operational amplifier on integrated circuit U1 which is connected as an electrical signal level detector. The threshold level is set by adjustable resistor R15 in the voltage divider which includes R15 and R14. The output of the level detector is coupled through diode CR8 and resistor bridge R18 and R19 to the gate of switch Q4 (RFP12N10L).

When the signal to which the input filter is tuned is applied across the tubing and the casing and when the tubing and casing are not shorted by a conductive fluid, the rectifier and regulator provide the local oscillator with regulated DC power. When fluid in the sensor capacitor increases the capacitance of the sensor capacitor, the output of the first operational amplifier changes until it crosses the threshold voltage set by resistor R15 and the second operational amplifier output then drives the gate of the switch which in turn grounds the output of the rectifier circuit. This has the effect of shorting the tubing and the casing presenting a very low impedance to signals applied thereto. Due to the capacitors C18 and C15 and diode CR10 at the output of the regulator circuit, a strong pulse is applied to the gate of the switch Q4 and is stored on capacitor C17. After a short interval the charge on capacitor C17 drains through resistor R19 and the switch Q4 stops conducting and the sensor circuit is again ready to respond to an input signal of the frequency of the tuning circuit.

Figure 4A:
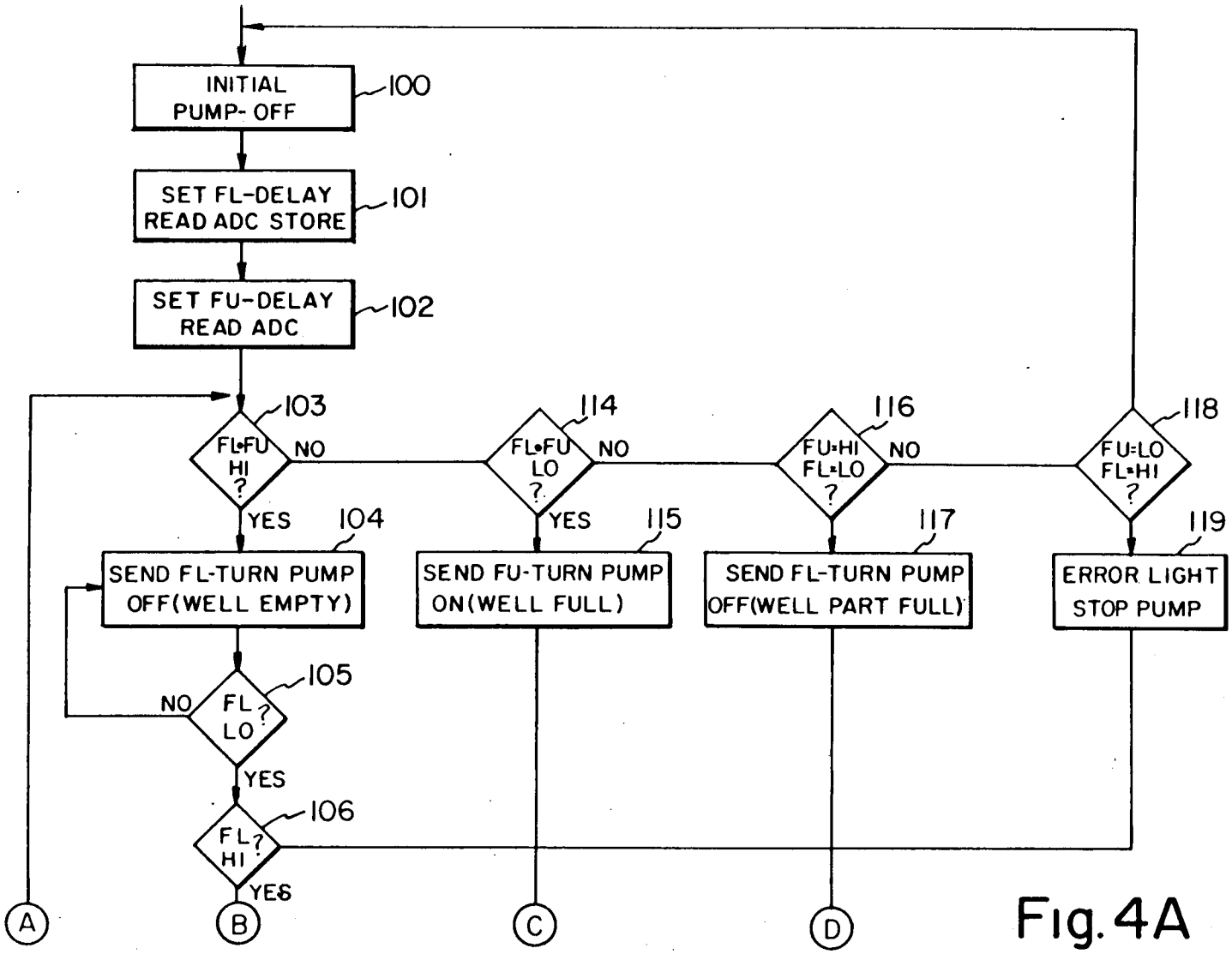
FIGS. 4A and 4B are a flow chart for understanding a computer program for controlling the controller.
Figure 4B:
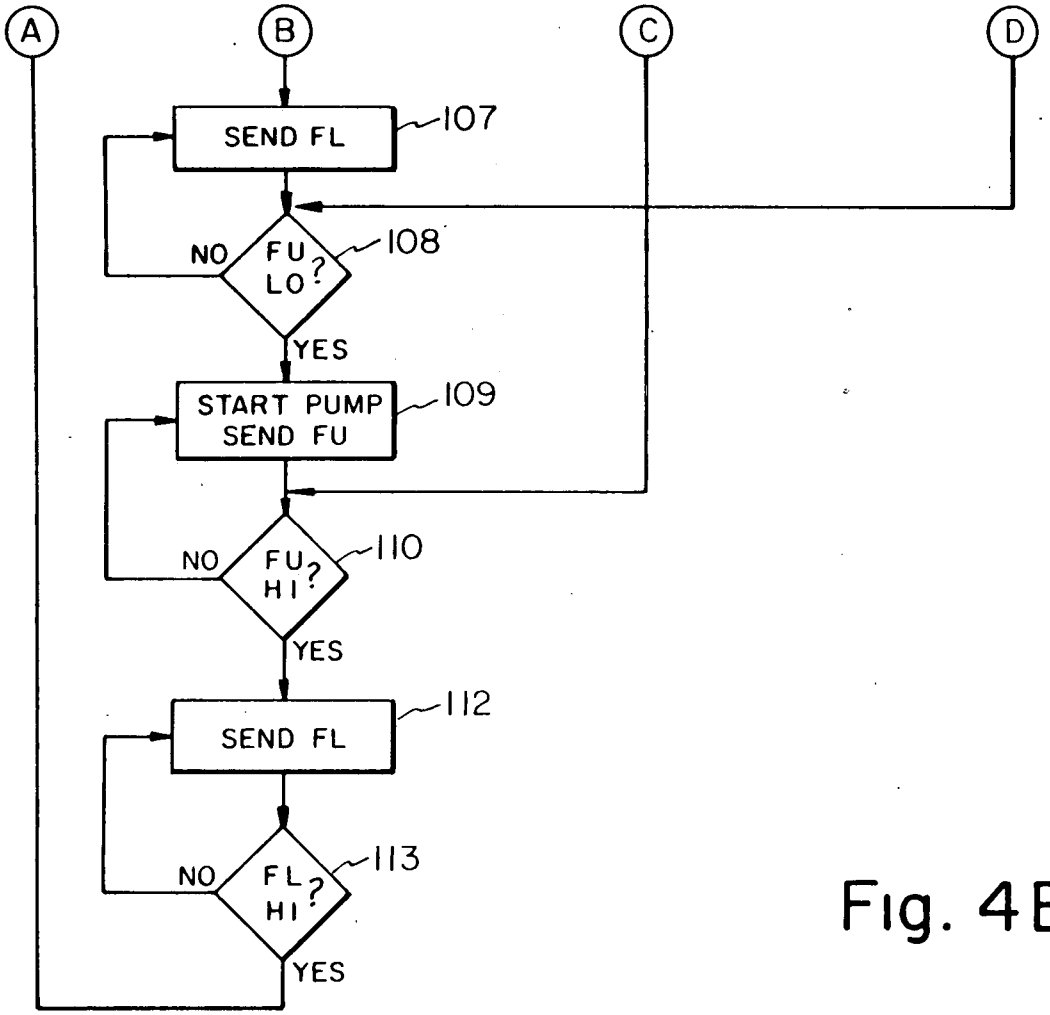

Referring now to FIGS. 4A and 4B, there is shown a flow diagram of a computer program for controlling the computer of the controller 35. The blocks in the diagram represent grouped or related functions or operations performed by the computer controlled by the computer program. The blocks in the diagram also represent a series of program statements or instructions for directing the computer. These can be supplied by a skilled programmer in a computer language that is appropriate to the architecture and instruction set of the particular microprocessing unit or central processing unit selected.

At the start of the program, an initial pump off command is issued, that is, the computer ensures that the pump motor is off, by commanding it off, as represented by block 100. Next, as represented by block 101, the computer commands the signal of frequency (FL) to which the lower sensor is tuned to be transmitted, delays and commands an input from the analog-to-digital converter (ADC) to detect the condition of the lower sensor. The condition of the lower sensor is stored in a temporary register or in a memory location. The delay is necessary for the switch Q4 to establish the low impedance condition if fluid is present at the sensor capacitor of the lower sensor. If the signal input from the ADC is indicative of a high impedance value, the wall is empty. Next, as represented by block 102, the computer commands a signal of frequency (FU) to which the upper sensor is tuned to be transmitted, delays and commands an input from the ADC. The condition of the upper sensor is stored. If the signal input from the upper sensor is indicative of a high impedance value, the well is not full.

The computer tests the conditions stored by the operations of blocks 101 and 102 at block 103. If in response to signals of both frequencies, the inputs from the ADC were indicative of high impedance, then control advances to block 104. The computer commands the pump motor to turn off (the well is empty) and the computer commands the frequency to which the lower sensor is tuned to be transmitted, delays and inputs from the ADC and stores the input value. At block 105, a test is made to determine if the input from the ADC is indicative of low impedance. If it is not, the control loops back to block 104. When the impedance value input at block 104 tests low at block 105, control is passed to block 106 which is representative of a test to determine if the last reading of the ADC in response to a signal to which the higher sensor responds was high. If it was, control is passed to block 107 which represents the operations of sending signals to which the higher sensor is tuned, delaying and inputting a value from the ADC and storing the input value. The computer next tests the ADC input at block 108. If it is high, control loops back to block 107. When the impedance value test low at 108, the operations are represented by block 109.

At block 109 the operations start the pump (the well is full) and the signal to which the upper sensor is tuned is transmitted and following a delay an input is read from the ADC and stored. The computer next tests the last ADC input at block 110. If it is indicative of a high impedance, control loops back to block 109. If it is indicative of a low impedance, control passes to block 112 wherein the signal to which the lower sensor is tuned is sent, and following a delay the value of the ADC is input and stored. At 113, the last input value is tested. If it is low, control loops back to block 112. If it is high (the well is now empty) control loops back to block 103 and the main loop comprising blocks 103 to 108 (well filling) and 109 to 113 (pump down) are repeated.

At block 103, if in response to both signals of both frequencies, the inputs from the ADC were not both indicative of high impedance, then control advances from block 103 to block 114. At block 114, a test is made for both inputs low (the well is full). This condition can occur when the well is started full. At block 115, the pump motor is started and the signal of frequency to which the higher sensor is tuned is sent, and after a delay a value is input from the ADC and stored. Control is then passed to block 110 in the main loop. At block 114, if both inputs are not low, control is passed from block 114 to block 116.

At block 116, the inputs are tested to determine if the upper sensor presents a high impedance and the lower sensor presents a low impedance (the well is part full). If so, at block 117 the pump is turned off and the signal of frequency to which the upper sensor is tuned is transmitted and after a delay the value at the ADC is read and stored. Control is then passed to block 108 in the main loop.

At block 116, if the inputs are not indicative of a part full well, control is passed to block 118. Here a test is conducted to determine if the lower sensor is presenting a high impedance and the upper sensor is presenting a low impedance (a condition that should never occur if all parts are properly working). If the test is affirmative an error indicator is set and the pump is shut down at block 119. The same set of impedance conditions can be detected at block 106 in the main loop which also transfers control to block 119.

The preferred embodiment disclosed herein makes use of a capacitive type level sensor. Other sensor types might be substituted therefore. For example, a pressure sensor having an electronic transducer associated therewith could be used to detect liquid level.

The preferred embodiment has been described with reference to the most common pumps, i.e., one actuated by sucker-rods. With minor adjustments, other pump types such as submersibles and jack screws could be controlled by the applicants' novel system.

Having thus defined the invention with the detail and particularity required by the Patent Law, the subject matter sought to be protected by Letters Patent is set forth in the following claims.

We claim:

1. A system for controlling production in an oil well having a casing at electrical ground potential, tubing within the casing, means for activating a pump at the lower end of the tubing comprising:

means for electrically isolating the tubing from ground potential so that the casing and tubing form a coaxial electrical conduit, first level sensing means mounted upon the outer surface of the tubing near the lower end of the tubing and means for establishing an electrical ground to the adjacent casing, means for tuning the first level sensing means to a first electrical signal frequency such that when an electrical signal of the first frequency is transmitted down the oil well the first sensing means will be powered thereby and establish a preselected impedance between the casing and tubing according to whether liquid is detected at the sensing means, second level sensing means mounted upon the outer surface of the tubing above the first level sensing means and means for establishing an electrical ground to the adjacent casing, means for tuning the second level sensing means to a second electrical signal frequency such that when an electrical signal of the second frequency is transmitted down the oil well the second sensing means will be powered thereby and establish an impedance between the casing and the tubing according to whether liquid is detected at the sensing means, and control means for at spaced intervals transmitting the electrical signals of first and second frequencies down the oil well and sensing the liquid level by detecting the impedance of the conduit and the sensing means corresponding to the frequency being transmitted, and when the first sensing means indicated no liquid at the lower end of the tubing, turning off the means for activating the pump and when the second sensing means indicated liquid at the upper end of the tubing, turning on the means for activating the pump.

2. The system according to claim 1 wherein the first and second level sensing means comprises an electronic circuit that closes an electronic switch that connects a resistance between the tubing and the means for establishing an electrical ground with the adjacent casing depending upon the level of the liquid at the sensing means to thereby change the impedance detectable by the control means.

3. The system according to claim 2, wherein the electronic circuits each comprise, rectifier circuits to establish a DC power source when the frequency to which it is tuned is applied.

4. The system according to claim 1 wherein just below the sensing means is an electrically insulating tubing material and the means for tuning the lower sensing means bridges the insulating section below the upper sensing means whereby an electrically conductive fluid below the lower sensing means will have no effect on the impedances detected by the controller and a conductive fluid below the upper sensing means will not effect the impedances determined when the frequency to which the upper sensing means is tuned is applied.

5. The system according to claim 1 wherein the controller means includes a programmed computer having a stored program for, at spaced intervals, commanding the output of the electrical signals first and second frequencies and for commanding the imputting of a numerical representation of the impedance of the coaxial electrical conduit comprising the casing and tubing.

6. A system for controlling production in an oil well having a casing at electrical ground potential, tubing within the casing, sucker-rods extending down through the tubing and means for causing reciprocation of the sucker-rods to activate a pump at the lower end of the tubing comprising:

means for electrically isolating the tubing from ground potential so that the casing and tubing form a coaxial electrical conduit, first capacitive level sensing means mounted upon the outer surface of the tubing near the lower end of the tubing having electrode means into which liquid can flow thus changing the capacitance therebetween thereby detecting fluid at the sensing means and means for establishing an electrical ground to the adjacent casing, means for tuning the first level sensing means to a first electrical signal frequency such that when an electrical signal of the first frequency is transmitted down the oil well the first sensing means will establish a preselected impedance between the casing and tubing according to whether liquid is detected at the sensing means, second capacitive level sensing means mounted upon the outer surface of the tubing above the first level sensing means having electrode means into which liquid can flow thus changing the capacitance therebetween thereby detecting fluid at the sensing means and means for establishing an electrical ground to the adjacent casing.

means for tuning the second level sensing means to a second electrical signal frequency such that when an electrical signal of the second frequency is transmitted down the oil well the second sensing means will establish an impedance between the casing and the tubing according to whether liquid is detected at the sensing means, control means for at spaced intervals transmitting the electrical signals of first and second frequencies down the oil well and sensing the liquid level by detecting the impedance of the conduit and the sensing means corresponding to the frequency being transmitted, and when the first sensing means indicated no liquid at the lower end of the tubing, turning off the means for causing reciprocation of the sucker-rods and when the second sensing means indicated liquid at the upper end of the tubing, turning on the means for causing reciprocation of the sucker-rods.

7. The system according to claim 6 wherein the first and second level sensing means comprises an electronic circuit that closes an electronic switch that connects a resistance between the tubing and the means for establishing an electrical ground with the adjacent casing depending upon the level of the liquid at the sensing means to thereby change the impedance detectable by the control means.

8. The system according to claim 7, wherein the electronic circuits each comprise, rectifier circuits to establish a DC power source when the frequency to which it is tuned is applied, an oscillator powered by said DC power source, a capacitance bridge to which the oscillator output is applied, a threshold circuit for detecting when the output of the capacitance bridge is above a selected threshold, the output of said threshold circuit being applied to said electronic switch.

9. The system according to claim 6 wherein just below the sensing means is an electrically insulating tubing material and the means for tuning the lower sensing means bridges the insulating section below the upper sensing means whereby an electrically conductive fluid below the lower sensing means will have no effect on the impedances detected by the controller and a conductive fluid below the upper sensing means will not effect the impedances determined when the frequency to which the upper sensing means is tuned is applied.

10. The system according to claim 6 wherein the controller means includes a programmed computer having a stored program for, at spaced intervals, commanding the output of the electrical signals first and second frequencies and for commanding the inputting of a numerical representation of the impedance of the coaxial electrical conduit comprising the casing and tubing.

11. The system according to claim 10 wherein the controller means during the pump down from the upper to lower sensing means tests for a high impedance condition before accepting a low impedance condition as indicative of liquid dropping below the lower sensing means to thereby avoid false readings due to shorting of the casing and tubing by conductive liquids between them above the lower sensor and below the upper sensor.

12. A liquid level sensor system for an oil well having a casing at electrical ground potential and tubing within the casing, comprising:

means for electrically isolating the tubing from ground potential so that the casing and tubing form a coaxial electrical conduit, a capacitive level sensing means mounted upon the outer surface of the tubing having electrode means into which liquid can flow thus changing the capacitance therebetween thereby detecting fluid at the sensing means and means for establishing an electrical ground to the adjacent casing.

means for tuning the level sensing means to an electrical signal of a preselected frequency such that when the signal of said frequency is transmitted down the oil well the sensing means will establish a preselected impedance between the casing and tubing according to whether liquid is detected at the sensing means, control means for at spaced intervals transmitting electrical signals of the said frequency down the oil well and sensing the liquid level by detecting the impedance of the conduit.

13. The system according to claim 12 wherein level sensing means comprises an electronic circuit that closes an electronic switch that connects a resistance between the tubing and the means for establishing an electrical ground with the adjacent casing depending upon the level of the liquid at the sensing means to thereby change the impedance detectable by the control means.

14. The system according to claim 13 wherein the electronic circuit comprises, rectifier circuits to establish a DC power source when the electrical signal of the frequency to which it is tuned is applied, an oscillator powered by said DC power source, a capacitance bridge to which the oscillator output is applied, a threshold circuit for detecting when the output of the capacitance bridge is above a selected threshold, the output of said threshold circuit being applied to said electronic switch.

15. The system according to claim 12 wherein just below the sensing means is an electrically insulating tubing material.

16. The system according to claims 6 or 12 wherein the electrode means comprises a cylindrical electrode spaced radially outward from the tubing and a portion of the tubing adjacent the cylindrical electrode whereby flow of fluid in the annular space defined between the cylindrical electrode and the tubing changes the capacitance therebetween.

17. The system according to claims 6 or 12 wherein the electrode means comprises a non-conductive cylinder spaced radially outward from the tubing of the non-conductive cylinder being equally spaced and radially aligned relative to the axis of the non-conductive tubing, said plates being in two groups connected to separate electrical leads, and the plates of one group being interleaved with the plates of the other group whereby flow of fluid in the annular space defined between the non-conductive cylinder and the tubing changes the capacitance between the two groups of plates.

*18. A system for controlling production in an oil well having an electrically conductive casing at electrical ground potential, an electrically conductive tubing within the casing, means for activating a pump at the lower end of the tubing comprising:*

*means for electrically isolating the tubing from ground potential so that the casing and tubing form a coaxial electrical conduit;*

*level sensing means mounted upon the outer surface of the tubing with means for establishing an electrical ground to the adjacent casing;*

*control means for transmitting electrical signals down the oil well, said signals powering the sensing means, and for turning off or on the means for activating the pump according to the level sensed by the level sensing means; and*

*said tubing comprising an electrically insulating tubing section just below the sensing means.*

*19. A system for controlling production in an oil well having an electrically conductive casing at electrical ground potential, an electrically conductive tubing within the casing, an electrically conductive sucker-rod extending down through the tubing and means for causing reciprocation of the sucker-rods to activate a pump at the lower end of the tubing comprising:*

*means for electrically isolating the tubing from ground potential so that the casing and tubing form a coaxial electrical conduit;*

*level sensing means mounted upon the outer surface of the tubing detecting fluid at the sensing means with*

*means for establishing an electrical ground to the adjacent casing;*

*control means for transmitting electrical signals down the oil well, said signals powering the sensing means, and for turning off or on the means for causing reciprocation of the sucker-rods according to the level sensed by the level sensing means;*

*said tubing comprising an electrically insulating tubing section just below the sensing means and said sucker-rod comprising a section adjacent the insulating tubing being of insulating material.*

* * * * *

UNITED STATES PATENT AND TRADEMARK OFFICE

CERTIFICATE OF CORRECTION

PATENT NO. : Re. 33,690

DATED : September 17, 1991

INVENTOR(S) : Harold P. Adams, Jr., Andrew B. Maitland, David R. Hill, William E. Banton, Lee M. Richey and David C. Taylor

It is certified that error appears in the above-identified patent and that said Letters Patent is hereby corrected as shown below:

Column 3 Line 5 "electrical" should read --electronic--.

Column 4 Line 4 "though" should read --through--.

Column 4 Line 50 "waling" should read --walking--.

Column 4 Line 63 "$mF_l$" should read --$mF_L$--.

Column 6 Line 34 "63" should read --65--.

Column 8 Line 20 "test" should read --tests--.

Claim 6 Line 46 Column 10 "casing." should read --casing,--.

Claim 12 Line 54 Column 11 "casing." should read --casing,--.

Signed and Sealed this

Twenty-third Day of February, 1993

*Attest:*

STEPHEN G. KUNIN

*Attesting Officer*

*Acting Commissioner of Patents and Trademarks*